(12) United States Patent
Braun

(10) Patent No.: US 6,200,247 B1
(45) Date of Patent: Mar. 13, 2001

(54) MACHINE TOOL WITH TOOL CHANGER

(75) Inventor: Hans-Dieter Braun, Frittlingen (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 0 days.

(21) Appl. No.: 09/503,325

(22) Filed: Feb. 14, 2000

(30) Foreign Application Priority Data

May 21, 1999 (EP) .................................................. 99109993

(51) Int. Cl.[7] .............................. B23Q 3/157; B23B 47/00
(52) U.S. Cl. .............................. 483/55; 29/560; 408/234; 409/134; 409/202; 409/212; 483/3; 483/54
(58) Field of Search ....................................... 409/108, 219, 409/137, 134, 235, 221, 220, 226, 202, 212, 198, 168; 408/234; 29/560, 561, 563, 276, 33 P

(56) References Cited

U.S. PATENT DOCUMENTS

| 4,484,387 | * | 11/1984 | Nachmany | 409/137 |
| 4,510,668 | * | 4/1985 | Ishida et al. | 409/221 X |
| 4,644,635 | * | 2/1987 | Murai | 483/54 |
| 4,700,452 | * | 10/1987 | Babel | 483/54 |
| 4,797,991 | * | 1/1989 | Yamaguchi et al. | 409/219 X |
| 5,611,137 | * | 3/1997 | Beaun | 29/560 |
| 5,669,867 | * | 9/1997 | Hoppe | 483/55 |
| 5,909,988 | * | 6/1999 | Hoppe et al. | 409/198 |

FOREIGN PATENT DOCUMENTS

626897 * 9/1978 (SU) ................................... 409/219

* cited by examiner

Primary Examiner—William Briggs
(74) Attorney, Agent, or Firm—Browdy and Neimark

(57) ABSTRACT

A machine tool and more particularly a drilling and/or milling machine, which has a machine stand, on which a slide arrangement, which runs on guide rails and is motor driven, is able to be moved in either direction of horizontal motion. On this slide arrangement a working head is arranged to receive rotary tools. Underneath the working head in a working area a power driven machining table runs along vertical guide rails for the performance of vertical working movements. The working area is laterally delimited by two side walls at least partly, such side walls extending in parallelism to the longitudinal direction, the vertical guide rails for the working table being arranged on one of the side walls. This means that there is a simple design allowing for removal of shavings to the rear and accordingly a narrow form of the machine. A further point is that a transverse wall connecting the side walls remains free so that there is simple access to a tool magazine arranged behind these part

14 Claims, 4 Drawing Sheets

MACHINE TOOL WITH TOOL CHANGER

BACKGROUND OF THE INVENTION

The invention relates to a machine tool and more especially a drilling and/or milling machine, comprising a machine stand, on which a first slide, which is borne on guide rails and is power driven, is able to be moved in a first horizontal direction of motion, a second slide, which is power driven, adapted to run in a second horizontal direction of motion perpendicular to the first direction of motion on the first slide, a working head, arranged on the second slide and having a drive device for at least one rotary tool, and a machining table in a working area underneath the working head, said head being adapted to be power-moved on vertical guide rails for the performance of vertical machining movements during the machining of workpieces by the working head.

THE PRIOR ART

Such a machine tool as disclosed in the German patent publication 1,477,580 A comprises a machine stand, which is made up of two plates joined together by the intermediary of four vertical rods. In this arrangement the rods serve as vertical guide rails for a machining table, whereas the top plate serves as the slide guide. The working range or area is open to all sides so that no regular, controlled removal of shavings removed from the material being machined, and also coolant and lubricant is possible. A further point is that the known design with rods is unsuitable for accurate work.

The non-prior published European patent application 97122348.2 also discloses a machine tool in accordance with the preamble of claim 1 herein. In the case of this machine tool vertical guide rails for the machining table are arranged on a part of the stand connecting two side walls of the machine stand. The disadvantage here is that on the one hand owing to such guide rails the tool magazine arranged behind is difficult to access and on the other hand owing to special design considerations it is necessary for a clearing passage for shavings etc. and also coolant and lubricant to extend perpendicularly to the side walls to one side of the machine, this conflicting with the desire to have a narrow overall design and with placing such machines in a row side by side.

SHORT SUMMARY OF THE INVENTION

One object of the invention is to so improve a machine tool of the type initially mentioned that a narrower design with better access and arrangement of a tool magazine is provided.

In order to achieve these and/or other objects appearing from the present specification, claims and drawings, in the present invention the working area is delimited by two side walls of the machine stand at least partly laterally, which side walls extend in parallelism to the first horizontal direction of movement and the vertical guide rails for the machining table are arranged on one of the side walls.

Owing to the arrangement of the vertical guide rails for the machining table on one of the two side walls the wall facing the machining area of the stand area connecting the two side walls is free for design developments so that it is simple to provide access to a tool magazine arranged behind. A further advantage is that the working area may be tapered underneath the machining table to a narrow discharge area, which extends in parallelism to that side wall, on which the vertical guide rails are arranged. This makes it possible have a discharge passage extending in parallelism to the two side walls or, respectively, between the same for shavings, coolant and lubricant, such passage extending toward the rear of the machine. This in turn renders possible a very narrow overall shape and a tandem arrangement of several such machine tools. Finally there is a substantial advantage because after machining of the mounting faces for the vertical guide rails a simple and exact subsequent adjustment of the longitudinal guide rails for the first slide, as for example using shims or padding, is possible. This may for instance be performed by placing the machine on that side wall which is provided for receiving the vertical guide rails.

The measures recited in the claims constitute advantageous further developments and improvements of the machine tool.

Two horizontal guide rails for the first slide extend at least partly on the side walls and parallel to same so that a slide guide for the first slide is produced which is extremely strong mechanically and is highly accurate.

One of these horizontal guide rails is best made longer than the other and the first slide possesses a three point guide means, two mutually spaced guide elements running on the longer guide rail and one guide element running on the shorter one. This means that the portion between the two guide rails remains free so that a tool magazine arranged here is readily accessible. An arrangement with particularly simple design advantages is one in which the machine stand possesses an asymmetrical rear wider part as an extension of the side wall bearing the longer guide rail, such extension carrying the rear part of such guide rail.

Preferably the asymmetrical wider part, which is more particularly arranged to the side of the center line between the two guide rails for the first slide, of the machine stand also has a lead screw drive for the first slide so that in this respect as well the middle portion having the tool magazine of the machine stand is readily accessible from the top.

The vertical guide rails for the machining table are preferably arranged on the side wall bearing the longer guide rail for the first slide, something which additionally contributes to strength and resistance to twisting.

The working area underneath the machining table preferably has an oblique face extending from the side wall not having the vertical guide rail obliquely downward to the oppositely placed side wall, such oblique face being designed as a guide face for shavings produced during machining and furthermore lubricant and coolant to a discharge duct arranged underneath the working area, which duct preferably extends between the side walls to the rear end area of the machine stand. The shavings or, respectively, the material cut from the work may accordingly removed in an ideal manner to the rear with the result that the two side walls remain free, this meaning that a compact arrangement of such machine tools in a row is possible. The discharge duct extending to the rear also makes its contribution to an extremely narrow design of the machine.

Underneath a machining plate the machining table has a configuration adapted to the form of the bottom part, which is delimited on one side by the oblique face of the machining area, so that in spite of the oblique face it is possible to adopt extremely low working positions and a compact arrangement.

At least in the lowermost position a drive motor secured to the stand for the machining table fits in a cavity in the machining table, the drive motor preferably driving a lead screw for the machining table. This is also something contributing to a compact and space saving arrangement.

It is an advantage to provide an area of the stand which delimits the working area to a third side, facing away from the machine operator, and which connects the two side wall, such stand area preferably comprising a tool magazine. For this purpose the stand area connecting the side walls possesses an access opening to the tool magazine from the working area. Owing to having ample access from the rear as well it is possible for this tool magazine to be arranged in the middle, something which also leads to a narrow design of the machine tool.

Owing to such satisfactory possibility of access it is possible for this tool magazine to be designed in the form of a drum or revolver magazine as well.

The vertical guide rails for the machining table are preferably arranged in the side wall, and preferably let into it more particularly so that the machining table as well fits into a vertical guide passage in this side wall.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
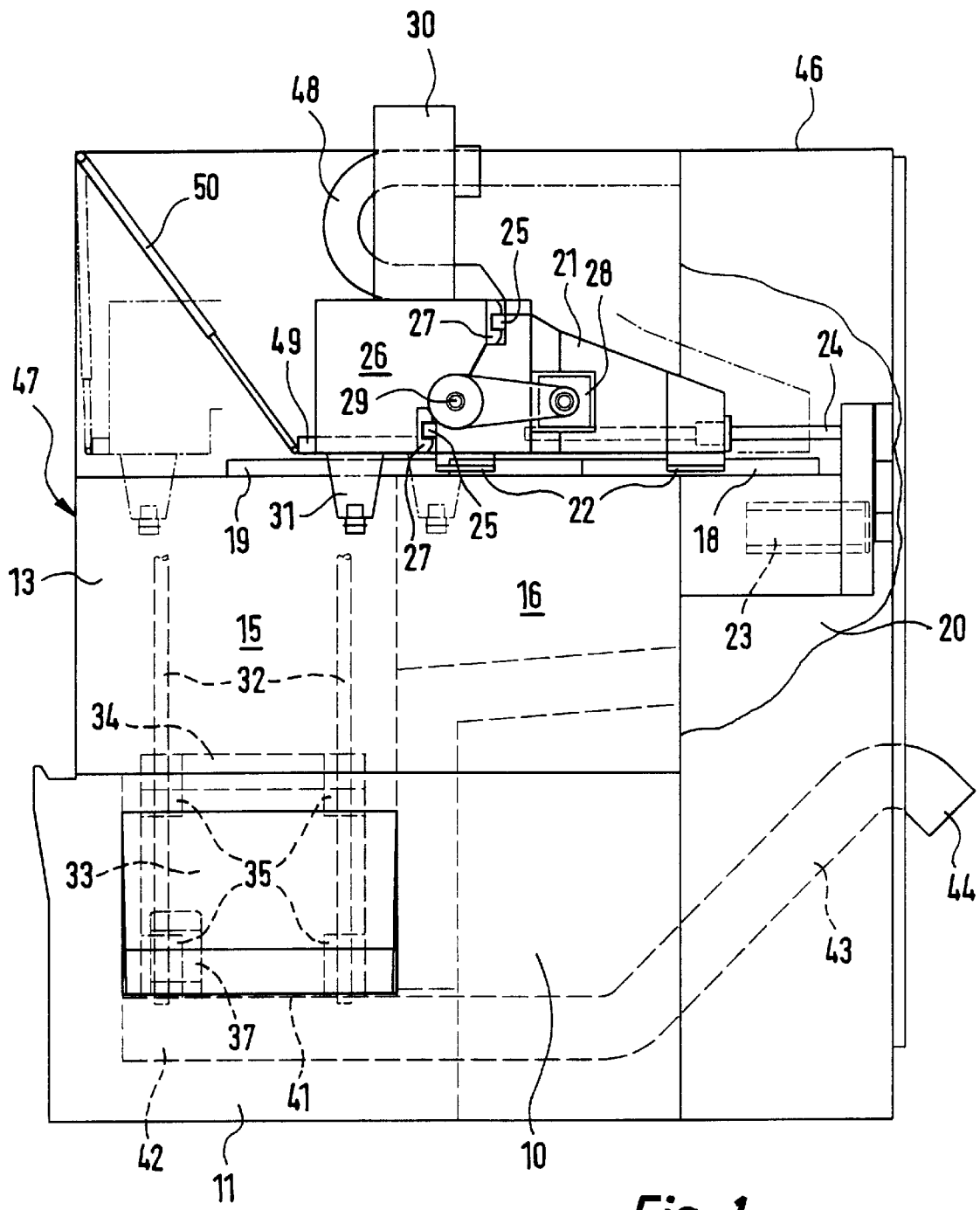
FIG. 1 shows a lateral view of a machine tool as a working example of the invention.

The machine tool illustrated in FIGS. 1 to 4 may be designed in the form of a drilling machine, a grinding machine, a milling machine or a combined machining center.

A machine stand 10 constituting the bed of the machine possesses a bottom basis area 11, from which on two opposite sides two side walls 12 and 13 extend upward. Together with a transverse wall 14 connecting them these side walls 12 and 13 delimit a working area 15 of the machine. A stand area 16 connecting these two side walls 12 and 13 on the side, remote from the machining area 15, comprises a tool magazine 17, designed in the form of a revolver magazine and arranged centrally in this stand area 16, that is to say substantially in the middle between the two side walls 12 and 13.

On the two side walls 12 and 13 two parallel guide rails 18 and 19 are secured in the longitudinal direction of these side walls 12 and 13 in the longitudinal direction of the machine stand 10. The guide rail 18 is substantially longer than the guide 19 and extends in the rear part of the machine on a widened part 20 extending the machine stand 10 asymmetrically to the rear, which essentially represents an extension of the side wall 12. This widened part 20 extends, as seen from the front, along a median line of the machine tool.

A longitudinal slide 21 is guided by means of three guide elements 22 on the two guide rails 18 and 19 horizontally. This means that there is a firm three-point supporting action. The longitudinal slide 21 is supported via two of the guide elements 22 which are arranged with a distance between them, on the longer guide rail 18. All in all this longitudinal slide 21 consequently has an essentially triangular configuration. A motor drive 23 arranged at the rear end of the widened part 20 drives a longitudinal lead screw 24, by which the longitudinal slide 21 is able to be driven in the longitudinal direction.

On its front side facing the working area the longitudinal slide 21 possesses two superposed transverse rails 25 which are offset in the longitudinal direction of the guide rails 18 and 19, on which transverse rails a transverse slide 26 is guided by guide elements 27 for movement athwart the direction of movement of the longitudinal slide 21 in a horizontal direction. Owing to the offset of the guide elements 27 in the longitudinal direction of the machine there is an oblique connecting face between the two slides 21 and 26 and the transverse slide 26 straddles the longitudinal slide 21 in the offset area of the transverse rails 2. The motor drive of the transverse slide 26 is via a drive motor 28 carried on the longitudinal slide, such motor 28 driving a transverse lead screw 29.

The transverse slide 26 possesses an integral working head which is in or on the transverse slide 26 and is prevented from moving vertically. A drive motor 30 for the working head extends upwardly out of the transverse slide 26 and a tool spindle 31 is arranged underneath the transverse slide 26 and serves to receive tools. It is driven by means of an arrangement, not illustrated, in the interior of the transverse slide 26 by the drive motor 30. In FIG. 1 two additional longitudinal settings of the slide 26 and of the tool spindle 31 are indicated in chained lines, while in FIG. 2 a second transverse setting is indicated in chained lines.

In the working area 1 on the left side wall 12 provided with the longer horizontal guide rail 18 two vertical guide rails 32 are arranged, on which a workpiece table or, respectively, a machining table 33 is guided vertically by means of guide elements 35, said table 33 being provided with a horizontal workpiece receiving plate 34. In principle it would be possible however for the vertical guide rails 32 to be arranged on the opposite side wall 13 as well. The two guide rails 32 are let into the side wall 12 so that the machining table 33 also fits into a vertical channel 36 in this side wall 12. For driving the parts there is a vertical lifting lead screw 38 driven by a drive motor 37, such lead screw being arranged centrally between the vertical guide rails 32. In the lowest position illustrated in FIG. 3 of the machining table 33 the drive motor 37, which is stationarily connected with the machine stand 10, extends from below into a cavity 39 in same. In an alternative design it would be possible for the drive motor 37 to be mounted externally on the machine bed or stand 10.

Underneath the workpiece receiving plate 34 an oblique wall 40 extends from the right hand side wall 13 downward toward the side wall 12 so that the working area underneath the workpiece receiving plate 34 tapers to a downwardly open slot 41. Underneath this slot 41 a discharge passage 42 is arranged in the bottom base area 11, which extends substantially in parallelism to the side walls 12 and 13 toward the rear end of the machine stand 10, as is illustrated in FIG. 1. In the rear area this discharge channel 42 firstly has a rising portion and then a discharge 44. Shavings produced in the course of machining and other material cut from the workpiece slide down the discharge channel 42 and are conveyed by a suitable conveyor means, such as a conveyor belt, to the outlet 44. Here it is possible for a carriage or container to be arranged to receive the shavings or the like. Coolant and lubricant also flowing along the oblique wall 40 are let or pumped off in some suitable manner not described here in detail from the discharge channel 42, and possibly returned to the circuit.

For machining a workpiece (not illustrated) clamped to the machining table 33 the horizontal movements (X-axis and Y-axis) are performed using the two slides 21 and 26, whereas the vertical movement (Z-axis) is performed by suitable control of the machining table 33. No matter what the respective position of the tool spindle 31 and of the working tool 33 is, in this respect there will be no projecting parts of the slides or the like, which might impair stability and accuracy of machining.

Figure 2:
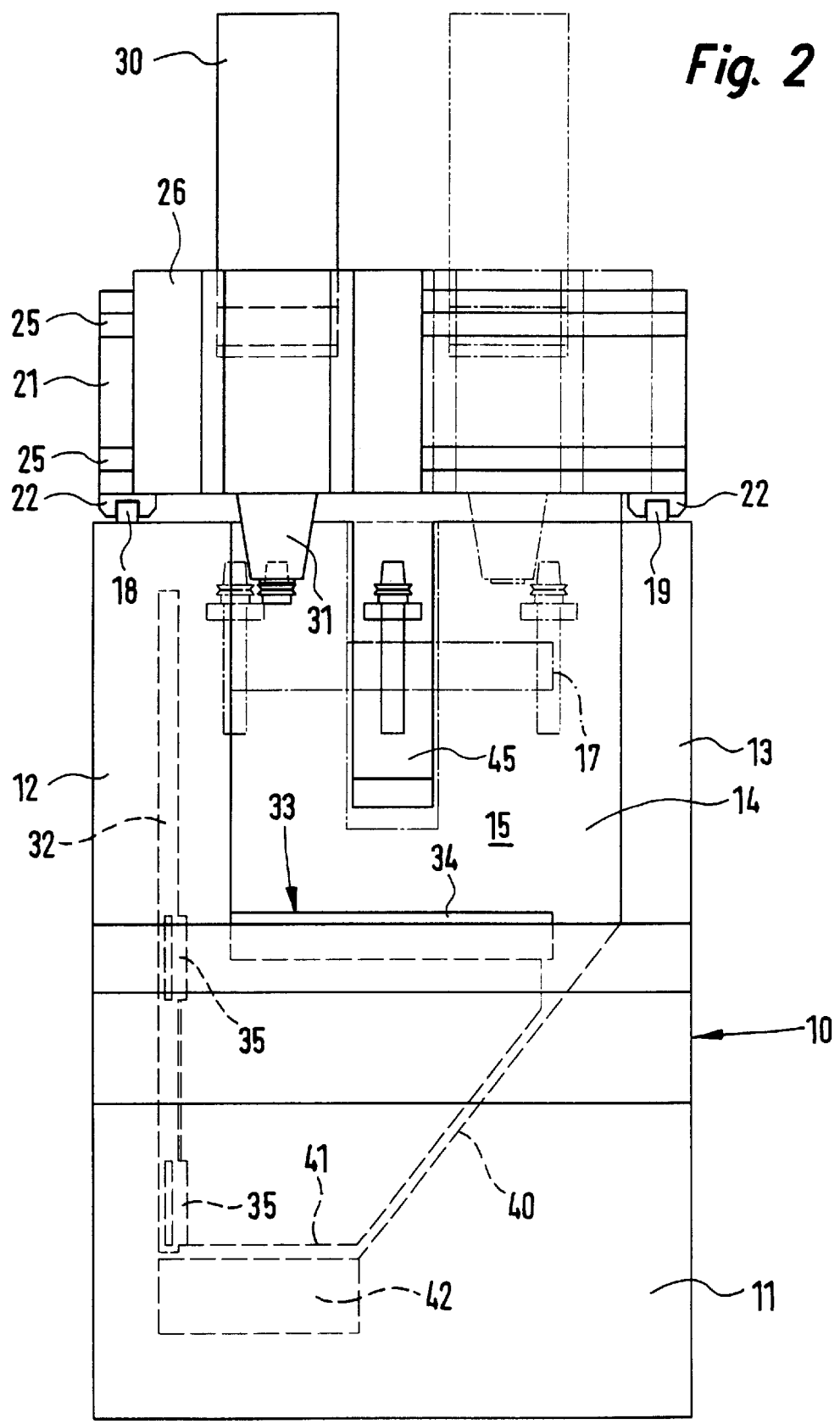
FIG. 2 shows such machine tool as seen from the front.
Figure 3:
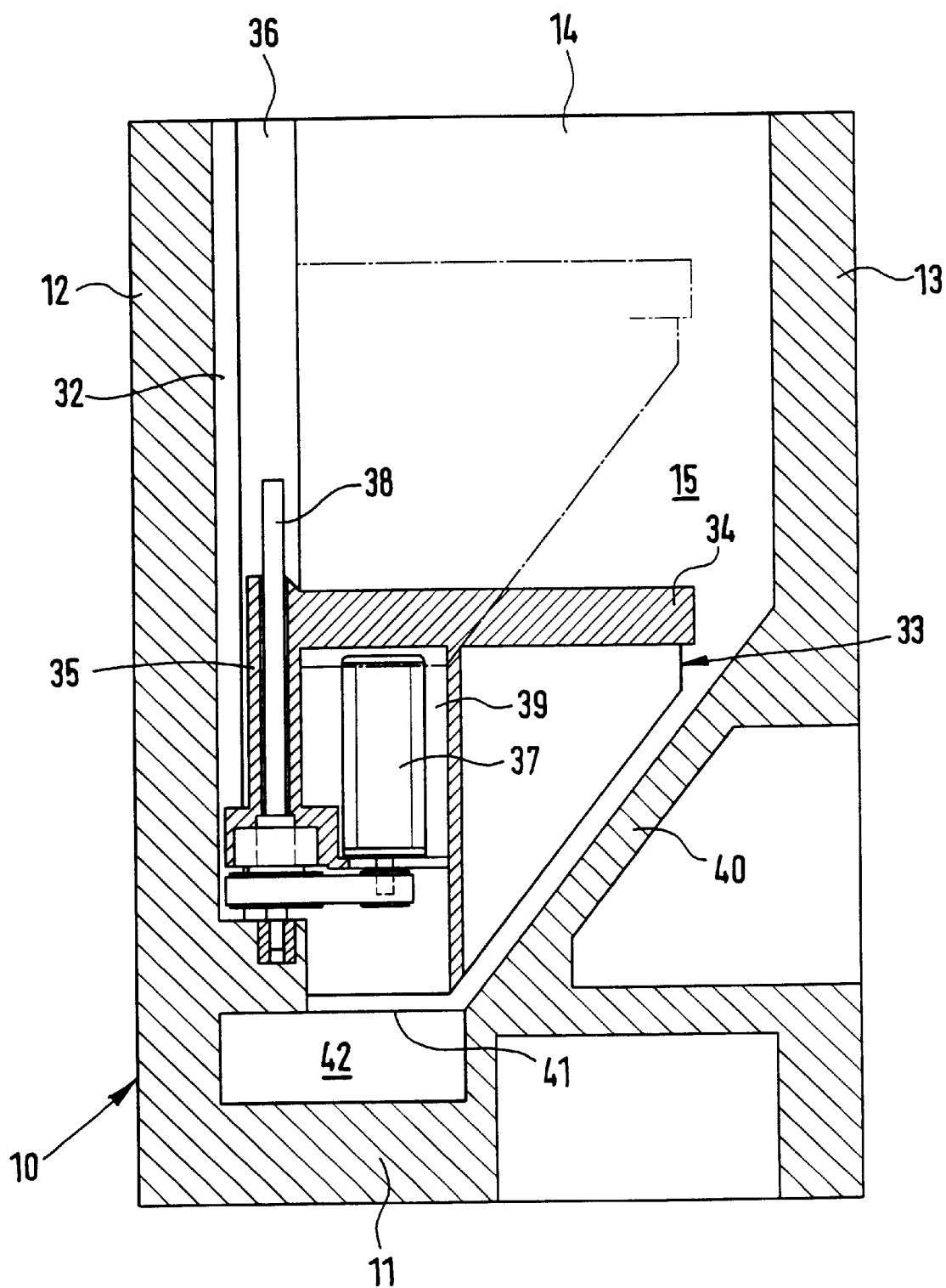
FIG. 3 shows the stand of the machine tool in vertical section through the machining table.
Figure 4:
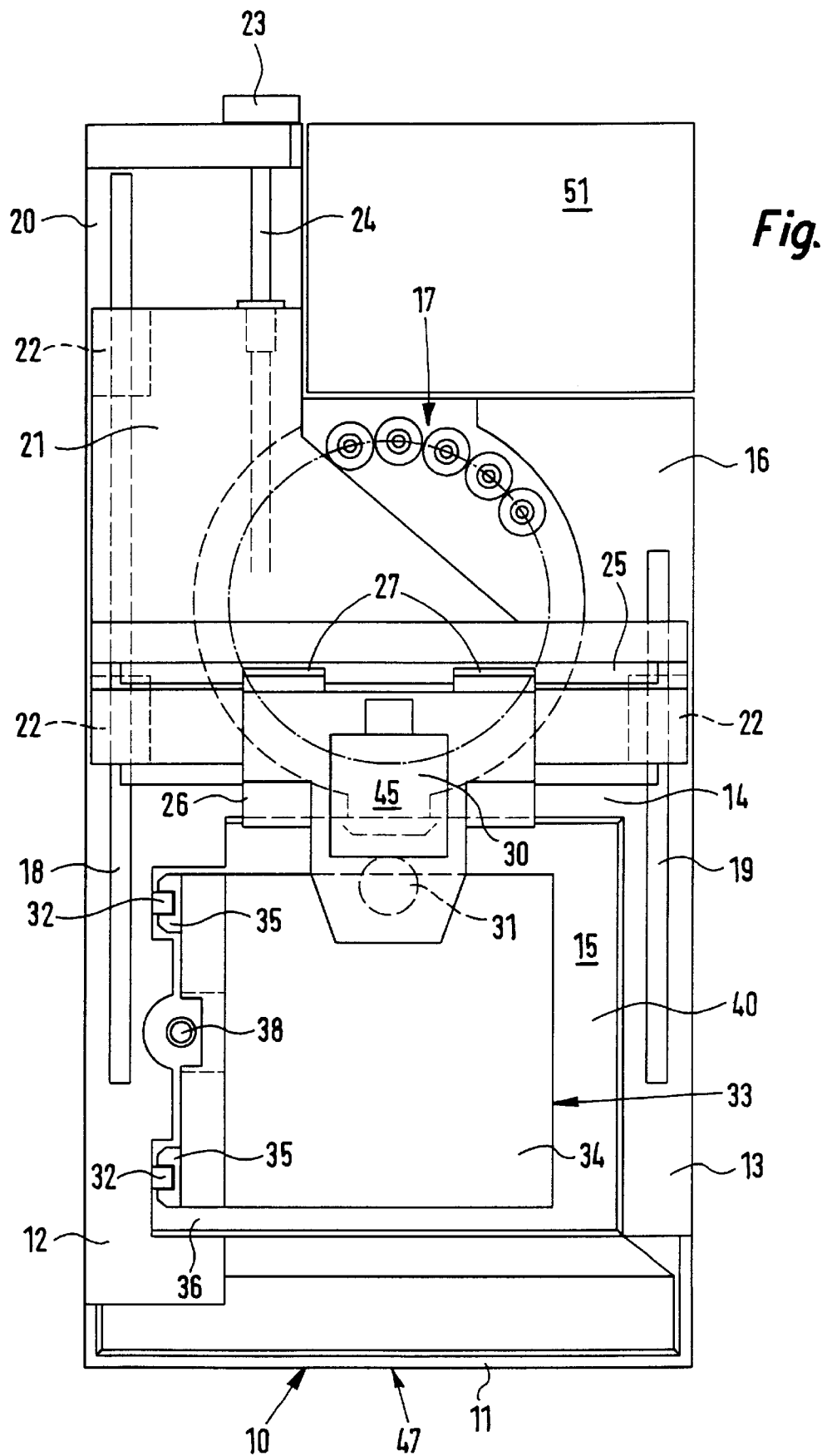
FIG. 4 shows the machine tool in plan view.

As shown in FIGS. 2 and 4 the tool magazine 10 as a part of a tool changing means is arranged in the stand area 16 connecting the two side walls 12 and 13 together. Between the working area 15 and a corresponding cavity for the tool magazine 17 it will be seen from FIG. 2 that there is a upwardly open through opening 45 in the transverse wall 14. Through it, using the slide drive, it is possible for the tool spindle 31 to be moved into this through opening 45 in order to transfer the tool employed so far to the tool magazine 17 and after suitable indexing rotation of this tool magazine 17 to take up the next tool desired.

The stand area 16 is open at its rear end in order to facilitate tool changing. This opening may naturally be closed by a flap or door or the like if desired.

As shown in FIG. 1 the machine tool is arranged in a housing 46, which in a manner not illustrated here in detail permits access to the working area 15 from the working side 47 because sliding, swinging or roller doors are provided. In the top area of the housing 46 there extends a flexible cable duct 48 to the rear from the horizontal slide arrangement in order to ensure the supply of electrical power to the slide arrangement.

A cover 50, which may be telescoped to change its configuration, extends from an attachment bar 49, which is arranged on the front, bottom area of the horizontal slide arrangement, toward the front top end of the housing 46. On movement of the transverse slide 26 to one side the cover 50 will become narrower and will fan out on the opposite side owing to movement apart of lamellas or sheet elements able to be wound up and down. On movement of the longitudinal slide 21 the distance of the attachment bar 49 from the front top corner of the housing 46 will be changed, the cover 50 adapting itself accordingly.

Owing to the asymmetrical rear widened part 20 on the machine stand 10 and, respectively, on the stand area 16 there is a square cavity to the side of this widened part 20. In this cavity a circuit housing 51 is arranged, which may contain the controls for the machine or at least a part of the machine controls, there being additional possibilities for the accommodation of spare parts and accessories.

What is claimed is:

1. A machine tool and a drilling and/or milling machine, comprising a machine stand, on which a first slide, which is borne on guide rails and is power driven, is able to be moved in a first horizontal direction of motion, a second slide, which is power driven, adapted to run in a second horizontal direction of motion perpendicular to the first direction of motion on the first slide, a working head, arranged on the second slide and having a drive device for at least one rotary tool, and a machining table in a working area underneath the working head, said table being adapted to be power-moved on vertical guide rails for the performance of vertical machining movements during the machining of workpieces by the working head, wherein the working area is delimited by two side walls of the machine stand at least partly laterally, which side walls extend in parallelism to the first horizontal direction of movement and the vertical guide rails for the machining table are arranged on one of the side walls.

2. The machine tool as set forth in claim 1, wherein two horizontal guide rails for the first slide extend at least partly on the side walls and in parallelism to the same.

3. The machine tool as set forth in claim 2, wherein one of the horizontal guide rails is made longer than the other and the first slide possesses a three point guide means, two mutually spaced guide elements running on the longer guide rail and one guide element running on the shorter guide rail.

4. The machine tool as set forth in claim 2, wherein in the prolongation of the side wall bearing the longer guide rail the machine stand possesses an asymmetrical rear widened part, which bears the rear area of this guide rail.

5. The machine tool as set forth in claim 4, wherein the asymmetrical widened part, which is arranged to the side of the median line between the two guide rails for the first slide, of the machine stand also bears a lead screw drive for the first slide.

6. The machine tool as set forth in claim 1, wherein the vertical guide rails for the machining table are arranged on the side wall bearing the longer guide rail.

7. The machine tool as set forth in claim 1, wherein the working area underneath the machining table possesses an oblique face or an oblique wall, which extends from the side wall not provided with the vertical guide rail in an oblique direction downward toward the opposite side wall, such oblique wall being designed as a guide face for shavings and also coolant and lubricant during machining to a discharge duct arranged underneath the working area, such duct extending preferably between the side walls toward rear end area of the machine stand.

8. The machine tool as set forth in claim 7, wherein underneath a working plate the machining table possesses a shape adapted to the bottom part, delimited by the side wall on one side, of the working area.

9. The machine tool as set forth in claim 1, wherein a drive motor, which is integral with the stand, for the machining table extends at least in the lowermost position of the table into a cavity in the machining table, the drive motor driving a lifting lead screw.

10. The machine tool as set forth in claim 1, comprising a stand area which delimits the working area toward a third side remote from the operator of the machine tool and connects together the two side walls, such stand area containing a tool magazine.

11. The machine tool as set forth in claim 10, wherein the stand area connecting together the side walls, or a transverse wall athwart this stand area possesses an access opening for the tool magazine from the working area, such opening being open in an upward direction.

12. The machine tool as set forth in claim 10, wherein the tool magazine, which is in the form of a revolver magazine, is arranged essentially centrally between the two guide rails or the side walls.

13. The machine tool as set forth in claim 10, wherein the tool magazine on the rear side of the machine stand is at least partly open or has a removable cover.

14. The machine tool as set forth in claim 1, wherein the vertical guide rails are let into the side wall in such a manner that the working table extends into a vertical guide passage or vertical channel in this side wall.

* * * * *